(12) United States Patent  
Corghi et al.

(10) Patent No.: US 8,453,702 B2  
(45) Date of Patent: Jun. 4, 2013

(54) DEVICE FOR BLOCKING A WHEEL RIM

(75) Inventors: Giulio Corghi, Correggio (IT); Andrea Bacchi, Correggio (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 573 days.

(21) Appl. No.: 12/705,272

(22) Filed: Feb. 12, 2010

(65) Prior Publication Data

US 2010/0200174 A1    Aug. 12, 2010

(30) Foreign Application Priority Data

Feb. 6, 2009 (IT) .................. RE09A0009

(51) Int. Cl.
*B60C 25/132* (2006.01)
*B60C 25/135* (2006.01)
*B60C 25/00* (2006.01)
*B27H 7/00* (2006.01)
*B29D 30/68* (2006.01)
*B60B 30/00* (2006.01)

(52) U.S. Cl.
USPC .......... 157/14; 157/1.22; 157/1.49; 157/1.24; 157/1.17; 157/1.26; 157/11; 157/12; 157/13; 157/15; 157/16; 157/17; 157/18; 157/19; 157/20; 157/21

(58) Field of Classification Search
USPC ............... 29/802; 157/1.22–1.27, 1.17, 1.49, 157/14
See application file for complete search history.

(56) References Cited

U.S. PATENT DOCUMENTS

| 2,973,791 | A | * | 3/1961 | French ............................ 157/14 |
| 3,094,156 | A | * | 6/1963 | Breazeale et al. ............... 157/14 |
| 3,774,664 | A | * | 11/1973 | Matysak ......................... 157/1.1 |
| 3,783,928 | A | * | 1/1974 | Lee ................................. 157/1.1 |
| 5,074,347 | A | | 12/1991 | Corghi |
| 6,516,855 | B2 | | 2/2003 | Corghi |
| 7,039,975 | B1 | * | 5/2006 | Liao ................................. 7/165 |
| 2004/0187302 | A1 | * | 9/2004 | Chu ................................. 29/802 |

FOREIGN PATENT DOCUMENTS

| EP | 0550816 A2 | 7/1993 |
| EP | 1157861 A2 | 11/2001 |

\* cited by examiner

*Primary Examiner* — Monica Carter
*Assistant Examiner* — Danny Hong
(74) *Attorney, Agent, or Firm* — Browdy and Neimark, PLLC

(57) ABSTRACT

The blocking device of a wheel rim on a tire-mounting machine is provided with a rotating support plate having a central hole, and includes a stem for engaging with the rotating support plate, and a cursor which is slidable on the stem and which includes a conical centring body and a device for activating for moving the cursor along the stem. The device for activating includes a mechanical transmission between a collar and a motor and the coupling between the cursor and the stem is such as to prevent rotation of the cursor about the stem.

11 Claims, 2 Drawing Sheets

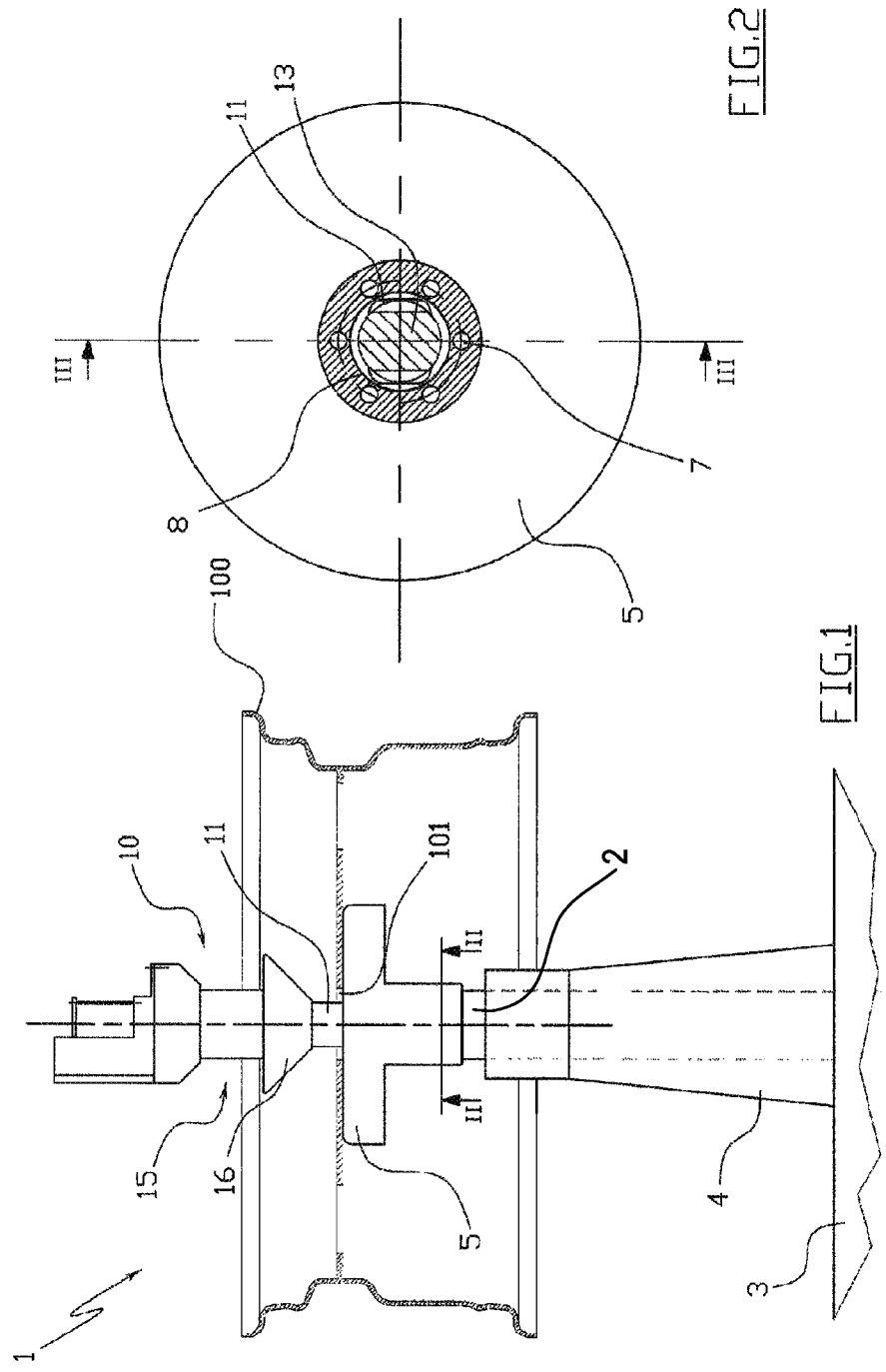

DEVICE FOR BLOCKING A WHEEL RIM

The invention relates to a self-centring device for blocking a wheel rim in a working position on a tyre-mounting machine, with the aim of fitting or removing a tyre from the wheel rim.

To block the rim in the work position, the prior art comprises tyre-mounting machines provided with a rotating support plate having a central axial hole, and also having a blocking device comprising a stem for axially inserting in a hole in the rotating support plate, which stem will then be axially blocked on the plate, a conical centring body which is slidably on the stem, and a fixing collar screwed on the stem and manually activated by the user by means of suitable handles.

Before performing the work operations on the wheel, the rim is rested in a horizontal position on the rotating support plate, placing the wheel hub approximately axially with the axial hole of the rotating support plate and then the stem of the blocking device is inserted in the wheel hub and blocked in the axial hole. After this, the conical centring body is displaced downwards up until it wedges on the wheel rim hub and the locking collar is activated to solidly block the conical centring body in the wheel rim hub.

The force with which the conical body acts on the rim depends on the locking torque of the collar.

This blocking system of the wheel rim hub enables the tools of the tyre-mounting machine to act contemporaneously on both the sides of the wheel, but presents the drawback of not ensuring in all circumstances a correct force for holding the rim still, depending on the locking torque of the collar.

If the torque applied manually by the user is excessive there is the risk that the force exerted by the centring cone will damage the rim hub. If the torque is insufficient, however, the force with which the centring cone fixes the rim to the rotating support plate is not sufficient and the forces applied by the tools of the tyre-mounting machine can be such as to displace the wheel during the tyre removing and fitting operations. If this displacement is excessive, the wheel or tyre can be damaged. This critical aspect is evident especially when working with large wheels, in particular with rims having diameters that reach or exceed thirty inches.

This is due to the fact that the tools of the tyre-mounting machine, as they work at the tyre position, create a tilting moment with respect to the rim hub, which moment is directly proportional to the diameter of the rim itself, and which tends to push the centring cone in an upwards direction.

A further drawback of these solutions is connected to the slowness with to which the rim fixing operations to the rotating support plate have to be done. These drawbacks lead to the need for a device which can guarantee correct blocking of all rims, including large rims, and which is also able to perform the operation rapidly.

The aim of the present invention is to respect to this need while offering a simple, rational and relatively inexpensive solution.

The aim is attained by a blocking device of a wheel rim on a centrally-holed rotating wheel-rim support plate of a tyre-mounting machine, the blocking device comprising a stem destined to be engaged in a central hole of the plate, and a cursor comprising a conical centring body being slidably mounted on the stem, a collar being provided for moving the cursor along the stem, characterised in that the cursor is prevented from rotating on the stem and bears a motor which is mechanically connected to the collar. The dependent claims delineate preferred and/or particularly advantageous aspects of the invention.

In particular, the invention makes available a device for blocking a wheel rim on a tyre-mounting machine provided with a rotating support plate having a central hole, the blocking device comprising a stem for engaging with the rotating support plate, and a cursor which is slidable on the stem, which cursor comprises a conical centring body and means for activating for moving the cursor along the stem, the means for activating comprising a mechanical transmission between a collar and a motor and the coupling between the cursor and the stem being such as to prevent rotation of the cursor about the stem.

Thanks to this solution a correct locking force can be applied on the rim and work on the tyre-mounting machine, on rims even of large size, can be done safely and without damage.

The mechanical transmission preferably comprises a screw-nut screw coupling which enables efficient transformation of the rotating motion of the motor into a linear motion of the cursor, while reverse transformation is strongly opposed.

Further characteristics and advantages of the invention will be evident from a reading of the following description which is provided purely by way of non-limiting example, with the aid of the figures illustrated in the accompanying tables of drawings.

FIG. 1 is a lateral view of a device of the invention.

FIG. 2 is section II-II of the device of FIG. 1.

Figure 3:
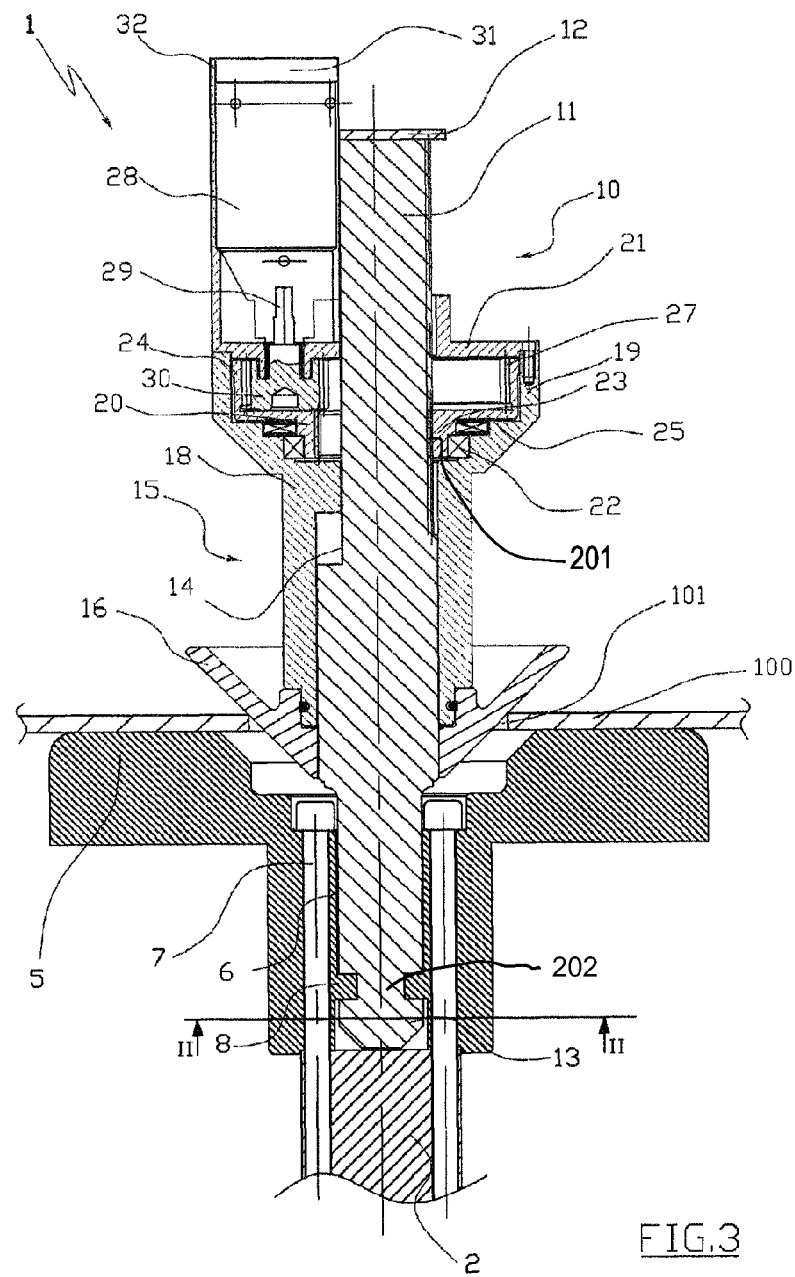
FIG. 3 is a section view of the device of FIG. 1.

The figures show a device 1 for supporting and blocking a rim 100 of a tyre-mounting machine, not completely illustrated as it is in itself of known type.

The device 1 comprises a vertical shaft 2 which juts from the base 3 of the tyre-mounting machine and which rotates about the axis thereof when activated by known means (not illustrated). The vertical shaft 2 is a rotating shaft. A screw-nut screw coupling 201 is defined between the collar 20 and the stem 11.

The projecting tract of the rotating shaft 2 is housed coaxially internally of a fixed protection cover 4.

The rotating shaft 2 is hole at a head thereof in order that a rotating support plate 5 for a wheel rim 100 can be fastened thereon by means of a series of locking screws 7.

As illustrated in FIG. 2, the plate 5 is generally circular and is provided with a central hole 6 suitably shaped to obtain a bayonet coupling which enables the blocking device 10 of the rim to be axially blocked, as will be better described herein below.

As illustrated in FIG. 3, the rim blocking device 10 comprises a stem 11 on which a cursor 15 is mounted, which cursor 15 can slide along the stem 11.

The stem 11 is threaded in the upper portion thereof and a lower end 13 thereof exhibits a shape which is such as to be insertable in the central hole 6 of the rotating support plate 5 and to be axially blocked thanks to the bayonet system of the plate 5.

The central hole 6 exhibits two shelves 8 facing towards the axis, while the lower end 13 of the stem 11 exhibits a tract 202 which inserts axially in the space between the shelves 8; when the stem 11 is inserted and rotated in a different blocking direction, the lower end 13 interferes with the shelves, preventing the stem from exiting.

With this solution the blocking device 10 is removably fixed to the support plate 5.

A flange 12 is present on the opposite end of the stem 11, the functions of which flange 12 will be more closely defined herein below.

The stem 11 exhibits an upper portion 14 having a non-circular section over a tract 14 thereof which is sufficiently long to be able to guarantee blocking of all types of rim.

A cursor 15 is inserted on the stem 11, an internal part of which exhibits a section which is complementary to the section of the non-circular portion of the stem 11.

The prismatic coupling between the stem 11 and the cursor 15 enables axial sliding of the cursor down to a lower limit position, but impedes rotation thereof.

The body 18 of the cursor 15 inferiorly bears a conical centring body 16.

The centring body 16 might be made in a single piece with the body 18 of the cursor 15.

In particular, the internal part of the body 18 exhibits a portion having a section which is complementary to the portion of the non-circular section of the stem 11 and has a length which is such as to guarantee correct sliding of the cursor 15 along the stem 11.

The upper end 19 of the body 18 broadens beaker-fashion to receive a collar 20.

The upper end 19 is superiorly closed by a cover 21 which is screwed to the body 18.

The maximum travel of the cursor 15 is superiorly limited by the flange 12 and by the cover 21 and inferiorly limited by the base of the non-circular profiles of the stem 11 and the body 18 of the cursor 15.

The collar 20 is preferably coaxial to the stem 11 and to the external element 18.

The collar 20 is axially blocked and is free to rotate internally of the upper beaker-shaped end 19 thanks to a radial bearing 22.

The collar 20 is a single piece composed of two portions 23 and 24, substantially cylindrical and having different diameters, connected by a flat portion 25.

The internal cylindrical surface of the portion 23 is threaded such as to couple to the threading of the stem 11.

An internally-cogged crown 27 is fashioned on the internal cylindrical surface of the portion 24.

The cover 21 bears a rotary motor 28 positioned such that the drive shaft 29 has an axis which is parallel to the stem 11 and which extends internally of the crown 27.

A cogged pinion 30 is keyed to the drive shaft 29, which pinion 30 engages with the cogged crown 27 of the collar 20.

The rotary motor 28 is preferably electric and is supplied by a battery.

A housing 31 for a battery is afforded at the rotary motor 28.

The activating command of the motor is given via a switch, not illustrated as of known type.

The support part of the rotary motor is shaped such as to function as a handle for the whole blocking device 10.

The activating of the motor 28 causes a relative rotation between the body 18 and the collar 20, and as the body 18 is prevented from rotating, the collar 20 is obliged to screw up onto the stem 11, impressing a vertical force on the body 18 and the cone 16 solidly constrained thereto, which vertical force is a function of the torque transmitted by the motor 28 to the collar 20.

An adjustment system of the torque delivered by the motor 28 enables the force transmitted to the cone 16 to be determined to a desired amount.

The regulation system of the torque transmitted by the motor can be mechanical, for example by realising an adjustable clutch, or electronic, for example by using a control circuit of the supply current of the motor.

In use, the rim 100 is positioned horizontally and rested on the rotating support plate 5 by substantially aligning the hub 101 of the rim 100 to the central hole 6 of the rotating support plate 5.

The stem 11 of the blocking device 10 is thus inserted in the central hole 6 and is made to rotate by an amount which is sufficient for obtaining a blocking thereof to the plate 5.

In this way the stem 11 is prevented from displacing vertically.

Thereafter the motor 28 is activated so that the cursor 15, which is initially substantially in the upper endrun position, is displaced downwards, bringing to the conical central body 16 towards the central hole 6 of the rotating support plate 5.

In this way the conical centring body 16 wedges in the hub 101 of the rim 100, centring it with respect to the rotating shaft 2 axis and the central hole 6, blocking it definitively in the work position against the rotating support plate 5. After having blocked the rim 100, the motor 28 can be stopped so that the mechanical transmission connecting the motor 28 to the cursor 15 guarantees that all the blocking device 10 remains exactly in the axial position reached, even when the conical centring body 16 is pushed upwards by effect of the forces exerted by the tools of the tyre-mounting machine during work operations.

In particular, the screw-nut screw coupling 201 between the collar 20 and the stem 11 is not reversible, so that the axial thrust unloading on the cursor 15 cannot cause rotation of the collar 20 and thus the axial displacement of the blocking device 10, even when the thrust is considerable due to the very large diameter of the rim 100.

When the operations are over, the unblocking of the rim 100 is obtained simply by rotating the motor 28 in an opposite direction to before, such as to raise of the cursor 15. Subsequently the whole blocking device 10 is rotated to disengage the stem 11 from the rotating support plate 5, and the blocking device 10 is removed from the central hole 6 of the plate 5.

Obviously a technical expert in the sector might bring numerous modifications of a technical-applicational nature to the blocking device as described herein above, without forsaking the ambit of protection of the patent as claimed herein below.

The invention claimed is:

1. A blocking device (10) of a wheel rim (100) on a centrally-holed rotating wheel-rim support plate (5) of a tyre-mounting machine, the blocking device (10) comprising:
   a stem (11) configured to be engaged in a central hole (6) of the plate (5),
   a cursor (15) comprising a conical centring body (16) being slidably mounted on the stem (11),
   a collar (20) for moving the cursor (15) along the stem (11), and
   a motor (28) directly fixed to the cursor (15), and mechanically connected to the collar (20) to move the collar axially along the stem, the cursor (15) being prevented from rotating on the stem (11).

2. The device of claim 1, wherein the collar (20) is engaged to the stem (11) by a screw-nut screw coupling (201).

3. The device of claim 1, wherein the mechanical connection between the motor (28) and the collar (20) comprises a rotational device for rotating the collar (20) about an axis thereof.

4. The device of claim 3, wherein the rotational device comprise a pinion (30) connected to the motor (28) and a cogged crown (27) associated to the collar (20), said cogged crown (27) being configured to enmesh with the pinion (30).

5. The device of claim 1, wherein the stem (11) has, for a tract thereof, a section which is not circular, on which a tract of a shorter length and complementary section of the central cavity of the cursor (15) slides, such as to prevent reciprocal rotations and to limit a travel of the cursor (15) along the stem (11).

6. The device of claim 1, wherein the motor (28) is an electric motor.

7. The device of claim 1, wherein the motor includes a torque regulation system.

8. The device of claim 7, wherein the regulation system is mechanical or electronic.

9. The device of claim 1, wherein the stem (11) is removably couplable to the rotating shaft (2) by means of a coupling.

10. A tyre-mounting machine comprising a rim blocking device as in claim 1.

11. A tyre-mounting machine having a centrally-holed rotating wheel-rim support plate and a rim blocking device, for blocking a wheel rim (100) on said centrally-holed rotating wheel-rim support plate (5), wherein the blocking device (10) comprises a stem (11) configured to be engaged in a central hole (6) of the plate (5), and a cursor (15) comprising a conical centring body (16) being slidably mounted on the stem (11), a collar (20) for moving the cursor (15) along the stem (11), wherein the cursor (15) is prevented from rotating on the stem (11) and bears a motor (28) which is mechanically connected to the collar (20).

\* \* \* \* \*